United States Patent [19]

Trepka

[11] Patent Number: 4,471,099
[45] Date of Patent: Sep. 11, 1984

[54] TREATMENT OF A HYDROGENATED POLYMER SOLUTION AFTER HYDROGENATION CATALYST REMOVAL TO IMPROVE SUBSEQUENT LITHIATION REACTION

[75] Inventor: William J. Trepka, Bartlesville, Okla.

[73] Assignee: Phillips Petroleum Company, Bartlesville, Okla.

[21] Appl. No.: 472,687

[22] Filed: Mar. 7, 1983

[51] Int. Cl.³ .................................................. C08F 8/30
[52] U.S. Cl. .................................... 525/338; 525/339; 525/366
[58] Field of Search ......................... 525/338, 339, 366

[56] References Cited

U.S. PATENT DOCUMENTS

| | | | |
|---|---|---|---|
| 2,893,982 | 7/1959 | Campbell | 260/85.1 |
| 3,023,201 | 2/1962 | Moberly et al. | 260/94.7 |
| 3,299,163 | 1/1967 | Zelinski | 260/681.5 |
| 3,531,448 | 9/1970 | Johnson | 260/85.1 |
| 3,696,088 | 10/1972 | DeVault | 260/85.1 |
| 3,751,384 | 8/1973 | Langer, Jr. | 252/431 N |
| 3,852,252 | 12/1974 | DeVault et al. | 260/85.1 |
| 4,028,485 | 6/1977 | Poloso et al. | 528/486 |
| 4,098,991 | 7/1978 | Kang | 525/338 |
| 4,145,298 | 3/1979 | Trepka | 252/51.5 A |
| 4,238,202 | 12/1980 | Trepka et al. | 44/62 |
| 4,278,506 | 7/1981 | Irvin | 203/68 |
| 4,402,843 | 9/1983 | Trepka | 252/50 |
| 4,402,844 | 9/1983 | Trepka | 252/51.5 A |

Primary Examiner—Joseph L. Schofer
Assistant Examiner—Bernard Lipman
Attorney, Agent, or Firm—Lyell H. Carver

[57] ABSTRACT

In the preparation of nitrogen-containing dispersant viscosity index improvers and/or gasoline detergent additives wherein a polymer cement is hydrogenated, an alkaline wash step following hydrogenation catalyst removal reduces residual poisons such that subsequent lithiation is improved. The lithiated copolymer thereafter is treated with various nitrogen-containing compounds reactive with the lithiated sites.

12 Claims, 2 Drawing Figures

TREATMENT OF A HYDROGENATED POLYMER SOLUTION AFTER HYDROGENATION CATALYST REMOVAL TO IMPROVE SUBSEQUENT LITHIATION REACTION

FIELD OF THE INVENTION

The invention relates to methods to improve the effectiveness of lithiation of hydrogenated copolymers. The invention further relates to lubricating oil and gasoline additives.

BACKGROUND OF THE INVENTION

In the preparation of nitrogen-containing polymers effective as dispersant viscosity index improvers for lubricating oils, and/or as detergent additives for gasolines, a polymer is prepared by solution polymerization of a monomer or monomers to result in a polymer cement (polymer in hydrocarbon solvent). Coupling may follow. The polymer is hydrogenated, and then treated for hydrogenation catalyst removal. In normal course, the next step is lithiation (metalation) to introduce numerous sites in the polymer for subsequent treatment with a suitably reactive nitrogen-containing organic compound to finally result in a polymer exhibiting effective dispersant and/or detergent properties.

However, a problem developed in the lithiation step. Commercially unacceptably high levels of lithiating agent were being consumed. The relatively high consumption of lithiating agent required use of excessive amounts lithiating agent in order to attain desired level of lithiation. Unless sufficient lithiation is attained, there are not sufficient sites in the polymer to react subsequently with the nitrogen-containing compound and the net result is that the polymer then does not exhibit sufficient dispersant activity or properties.

In order to have a reasonably economical process of producing the nitrogen-containing hydrogenated polymers, and to assure sufficient resulting activity therein, a method was needed to reduce the amounts of lithiating agent required.

BRIEF SUMMARY OF THE INVENTION

I have discovered that in the preparation of dispersant, nitrogen-containing hydrogenated copolymers, that the lithiation (metalation) step is greatly improved in effectiveness with much reduced demand for lithiating agent when the polymer cement resulting from the hydrogenation catalyst removal step is first treated with an alkaline wash step prior to the lithiation step. Thus, my process inserts a step into the overall process of solution polymerization—hydrogenation—hydrogenation catalyst removal—alkaline wash—lithiation—treatment with nitrogen-containing organic compound, to poduce a dispersant hydrogenated polymer.

While I do not wish to be bound by theory, it is assumed that some sort of poisons inimical to lithiating agents remain in the polymer cement, scavengers or poisons in the reaction mixture, possibly resulting from the hydrogenation step and/or the hydrogenation catalyst removal step.

The alkaline wash step, since it employs an aqueous dispersion/solution of alkaline material, is followed by a suitable alkaline rinse step to remove traces of alkaline material, and a suitable drying step to remove residue moisture, prior to the subsequent lithiation step.

BRIEF DESCRIPTION OF THE DRAWINGS

FIG. 1 illustrates in a block schematic form the placement of my alkaline wash step in the overall process of preparing the dispersant/detergent polymers.

Figure 1:
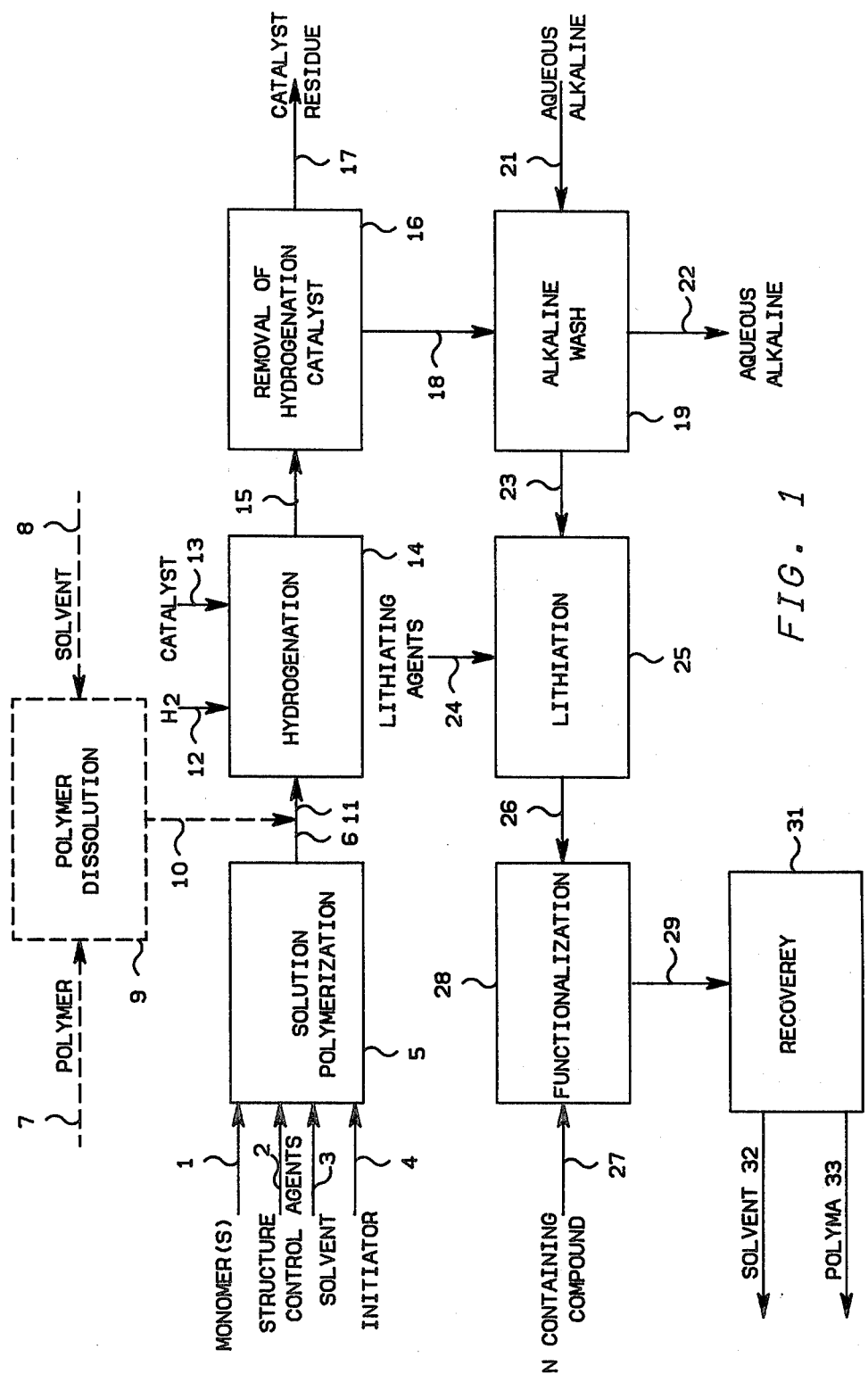
FIG. 1

Monomer(s) 1, structure control agent 2, solvent 3, and initiator 4, are contacted under solution polymerization 5 conditions to form a polymer-cement 6. Alternatively, a pre-formed polymer 7 and solvent 8 are admixed 9 for polymer dissolution to form polymer-cement 10.

Polymer cement 11 is contacted with hydrogen 12 and hydrogenation catalyst 13 under hydrogenation conditions 14. This step destroys any remaining active lithium from initiation.

The resulting hydrogenated polymer (still in solution but now containing hydrogenation catalyst residues) 15 is treated 16 for removal of hydrogenation catalyst residues 17.

The hydrogenated polymer (cement) 18, now cleansed of hydrogenation catalyst residues, is treated by an aqueous alkaline wash step 19 wherein the polymer cement is contacted with an aqueous solution/dispersion of an alkaline agent 21. The alkaline wash is separated and removed 22 for recycle or reuse. The cleansed but now wet polymer cement is dried to remove residue water.

The now cleansed and dry polymer cement 23 is contacted with appropriate lithiating agent(s) 24 in lithiation step 25.

The lithiated polymer cement 26 is contacted with an organic nitrogen-containing compound 27 in functionalization step 28.

The organic nitrogen-containing functionalized polymer (cement) 29 is treated in recovery step 31 for separation of the solvent 32 and recovery of the polymer 33 for use in oils or gasolines as desired. Solvent is recovered, normally, for recycle (not shown).

FIG. 2

Figure 2:
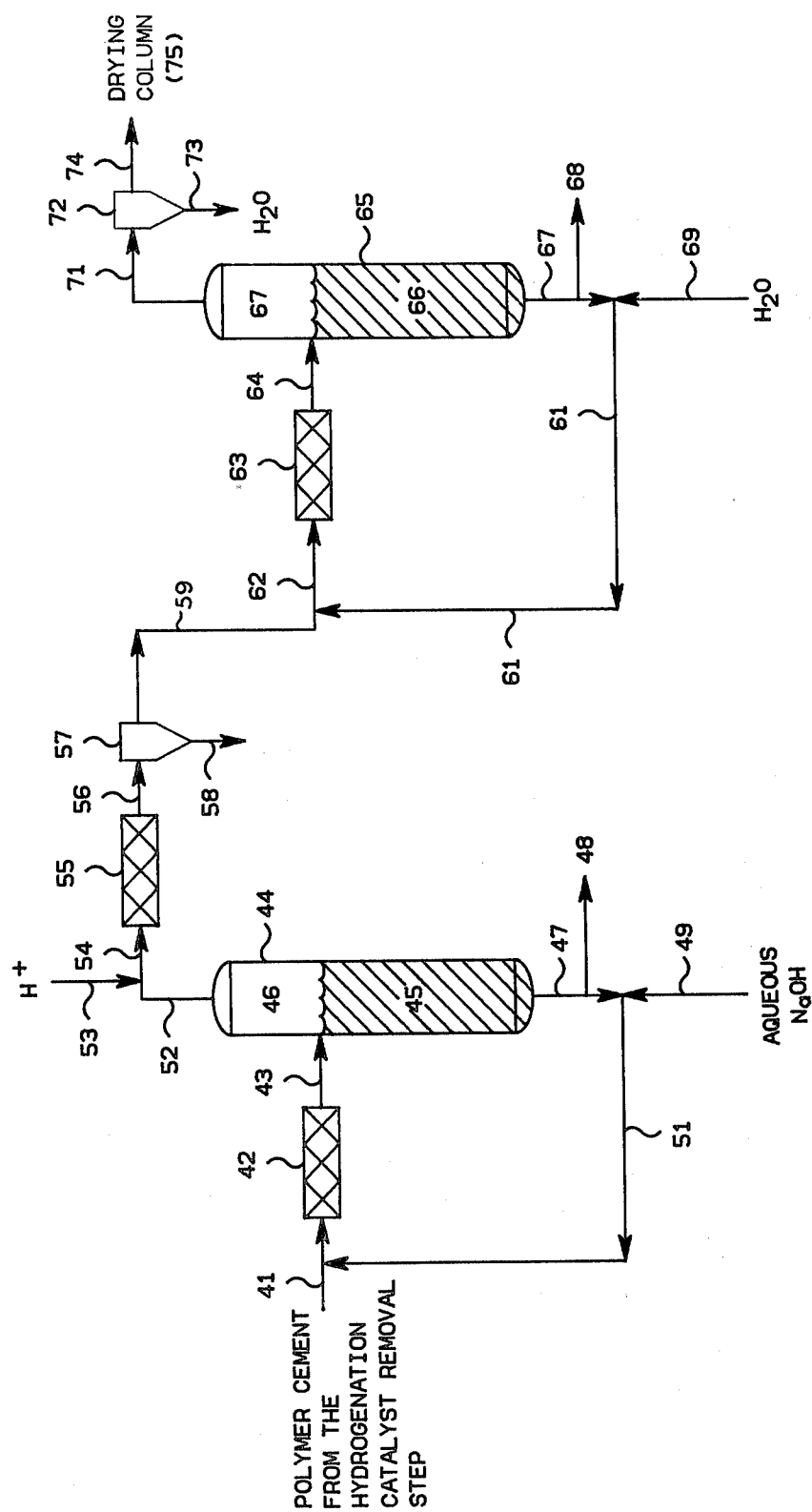

FIG. 2 illustrates in more detail one method of incorporating the alkaline wash and drying step (step 19 in FIG. 1) into the functionalized polymer preparation scheme in accordance with my invention.

A polymer cement from hydrogenation catalyst removal 18 is admixed with aqueous alkaline solution 51, separated 44, and neutralized 53. The substantially neutralized polymer cement 59 is washed with water 61, and again separated 65. The washed polymer cement 74 then is sent to such as a drying column 75 (not shown).

DETAILED DESCRIPTION OF THE INVENTION

In the process of my invention, a polymer is prepared by solution polymerization, hydrogenated, treated for removal of hydrogenation catalyst residues, and treated by an alkaline wash step. Such step has been found by me to improve the subsequent lithiation (metalation) step. Apparently the alkaline wash removes lithium-poisons or scavengers that otherwise adversely affect the lithiation. Following the alkaline wash treatment, the so-treated polymer cement preferably is substantially neutralized, water washed, and dried. The now cleansed and dried polymer cement then is lithiated, and subsequently treated with any of a variety of nitrogen introducing compounds to result in the dispersant viscosity index improver and/or dispersant gasoline additives, as may be desired.

The feed stream to which the alkaline-wash treatment is applied is a polymer cement (polymer in hydrocarbon solvent) obtained from a hydrogenation catalyst removal step.

The alkaline-wash treatment can be more readily visualized by reference to FIG. 2. In FIG. 2, the polymer cement 18, from hydrogenated catalyst removal, is admixed with aqueous alkaline admixture 51, such as a mild solution of NaOH in water, to form stream 41 which is thoroughly mixed, such as by an in-line motionless mixer 42.

The admixed stream 43 is taken to a first operator 44, such as a coalescer. The alkaline wash settles (separates) to the bottom 45, and the washed polymer cement separates to the upper area 46.

The separated (exhaust) alkaline wash 45 is withdrawn 47. A portion can be removed, if desired, for separate recovery of reuse 48. The remaining exhaust stream augmented as to strength or concentration as may be necessary or desirable by fresh alkaline aqueous admixture 49, to forms recycle stream 51, and is recycled to contact further polymer cement 18 from the hydrogenation catalyst removal step.

The alkaline-washed separated treated polymer cement 46 which, of course, contains some traces of alkaline material treating agent and water, is removed 52, preferably contacted with an acidic $H^+$ agent 53 to form stream 54, preferably thoroughly admixed in such as an in-line mixer 55. The neutralized treated admixed polymer cement stream 56 is allowed to separate, such as in a coalescer 57. Any separated aqueous solution/dispersion is removed 58 as needed for disposal.

The separated treated neutralized polymer cement 59 is admixed with water 61, which may be fresh, recycle, or admixture, and the mixture 62 is thoroughly admixed to wash the polymer cement, such as by an in-line mixer 63. The mixed washed stream 64 is taken to a second separator 65. The water separates (settles) to form lower layer 66. The washed cleansed polymer cement forms upper layer 67.

The separated water bottoms 66 is removed 67. A portion or side-stream usually is withdrawn 68 to waste disposal or purification (not shown) depending on the condition of the withdrawn separated water 66–67 as to salts content and the like.

Fresh or cleansed water 69 is added, as needed, to form water recycle stream 61.

The separated water-washed polymer-cement 67 is withdrawn overhead 71, passed through a de-waterer or settler 72. Any water that separates is removed 73, for disposal or reuse depending on its quality. The dewatered stream 74 sent to polymer drying, such as a suitable drying columns 75 (not shown).

POLYMERS

While the process of my invention is applicable to any solution-polymerized polymer system utilized ultimately in preparing dispersant type polymers as described hereinabove, usually the copolymers involved are produced by copolymerizing under solution polymerization methods at least one hydrocarbon conjugated diene with at least one monovinylarene hydrocarbon, presently preferably and typically butadiene and styrene, to produce copolymers. Methods of producing such polymers have been well described and need not be described in great detail here.

Several types of particularly useful copolymers for lube oil and gasoline additives are described in such as my patent U.S. Pat. No. 4,145,298 issued Mar. 20, 1969, and also in patent U.S. Pat. No. 4,238,202 issued Dec. 9, 1980, wherein I am coinventor with Richard J. Sonnenfeld; both of which patents are herein incorporated by reference.

Suitable conjugated diene monomers are those aliphatic hydrocarbon conjugated dienes of four to eight carbon atoms per molecule. Exemplary conjugated dienes include butadiene, isoprene, 2,3-dimethyl-1,3-butadiene, piperylene, and the like. Suitable monovinylarene monomers are the hydrocarbon monovinylarenes of eight to fifteen carbon atoms per molecule. Exemplary monovinylarenes include styrene, α-methylstyrene, 3-methylstyrene, 3,5-diethylstyrene, 4-tolylstyrene, and the like.

In my discussions hereinafter for simplicity and convenience I use styrene as representative of as well as the preferred monovinylarene, and 1,3-butadiene as representative of as well as the preferred conjugated diene. Similarly butadiene/styrene copolymers are discussed as representative of the applicable conjugated diene/monovinylarene copolymers generally.

Suitable copolymers will contain about 20 to 70 percent by weight copolymerized styrene, the balance then being copolymerized butadiene, more preferably about 50 to 65 weight percent styrene and the balance butadiene. These copolymers presently preferably are substantially random copolymers, but can contain significant blocks of polystyrene and/or blocks of polybutadiene and/or blocks of random or random tapered butadiene/styrene. These copolymers also can be represented by such as B/A, A-B, and B/A-A, wherein A is a block of polystyrene, B is a block of polybutadiene, and B/A represents either a random copolymer block of butadiene/styrene, or a tapered block of butadiene/styrene, with the realization that B/A also can contain appreciable block structure of polystyrene. The use of the designation B/A when used with reference to tapered random blocks indicates the direction of taper with the B/A blocks. These blocks, while considered random, gradually decrease in content of the first indicated monomer along the block, due to the mode of preparation used. The block polystyrene A content of the random block copolymer B/A-A preferably should be in the range of less than about 35, more preferably less than about 25, weight percent. For most usages, a block polystyrene A content of less than about 5, and preferably less than about 2.5, weight percent is suitable and effective, such as 0.5–5 weight percent.

The butadiene/styrene copolymers employed to prepare gasoline additives should have a number average molecular weight in the approximate range of 1,000 to 10,000, presently preferred about 5,500 to 8,500. The copolymers, as far as the polymerized butadiene portion, should have a vinyl unsaturation content prior to hydrogenation of about 20 to 95 percent, preferably about 20 to 70 percent. (The vinyl unsaturation content refers to the percentage of the total unsaturated bonds in the polymerized butadiene portion of the copolymer which are in the form of vinyl unsaturation). The copolymers are of a type and molecular weight which as finally modified provide significant detergency improving properties to the hydrocarbon fuel, and still have sufficient fuel solubility to be formulated into the hydrocarbon fuel.

The butadiene/styrene copolymers which are employed to prepare lube oil additives should have a number average molecular weight in the approximate range of 20,000 to 300,000, presently preferred about 25,000 to 100,000. The copolymers, as far as the butadiene portion, will have a vinyl content prior to hydrogenation of about 20 to 95 weight percent, preferably about 20 to 70 weight percent. The copolymers are of a type and molecular weight which, as finally modified, provide significant viscosity index improving properties to the oil when so used, have sufficient oil-solubility to be formulated into lubricating oils, and possess significant shear stability in such oil formulations.

Hydrocarbyl monolithium initiators well known in the arts are employed in an amount effective for polymerization of the monomer charge employed to the molecular weight desired. Polymerization is conducted by contacting the monomer charge with the monolithium initiator in a suitable diluent. Diluents employed for the purpose include any of the paraffinic, cycloparaffinic, or aromatic hydrocarbons known to the art, used alone or in admixture, typically of 4 to 10 carbon atoms per molecule in commercial operations. Cyclohexane currently is preferred for ease of handling, high solubility of polymer, and availability.

Polymerization can be carried out at any convenient temperature employed in the solution polymerization arts. Suitable and exemplary temperatures lie in the range of from less than about 0° C. to over 200° C., presently preferred about 40° C. to 100° C., since these temperatures are consistent with obtaining the desired copolymers. The pressures employed can be as convenient, though preferably pressures are employed sufficient to maintain monomers and diluent substantially in the liquid phase. The polymerization times can vary widely as may be convenient, and will, of course, be affected by polymerization temperatures chosen. Time preferably should be chosen such that substantially complete conversion of monomers is obtained.

To prepare the A-B copolymeric structure, either styrene or butadiene can be first polymerized and then the other monomer added and polymerized to result in the A-B copolymer.

Alternatively, a mixture of the butadiene and styrene monomers can be copolymerized in desired proportion under randomizing conditions to produce a B/A copolymer. In another mode, a B/A structure can be first prepared by polymerizing a suitable butadiene/styrene admixture to the desired degree of conversion, and this usually will produce a tapered block since butadiene tends to polymerize somewhat faster to start with, and then subsequently additional styrene can be added to form an A block onto the first formed B/A block. Alternatively, and presently preferred, a mixture in a suitable ratio of butadiene and styrene can be copolymerized, under limited randomizing conditions, and this then permits formation of a preferred B/A-A structure since the faster polymerization of the butadiene exhausts the butadiene, and remaining styrene then block homopolymerizes.

Where a substantially random B/A portion is desired, employment of a randomizing agent can be included at the suitable stage in the polymerization, typically selected from ethers, thioethers, and amines, and others as is known in the art, typically such as tetrahydrofuran, or from the alkali metal alkoxides other than of lithium, typically such as potassium t-butoxide or potassium amyloxide.

HYDROGENATION

The hydrogenation procedure employed should be effective so as to substantially reduce olefinic unsaturation including vinyl unsaturation, while leaving essentially untouched aromatic unsaturation present in the monovinylarene portion of the copolymer.

Hydrogenation can be conveniently conducted directly on the unquenched polymerization reaction admixture from the solution polymerization procedure. Alternatively, where convenient, the polymerization can be quenched, the polymer recovered, and then redissolved in a suitable hydrocarbon solvent for hydrogenation purposes.

Hydrogenation catalysts suitable are such as those described in U.S. Pat. No. 3,531,448. These catalysts comprise reaction products of aluminum alkyl compounds with either nickel or cobalt carboxylates or alkoxides. Typical of the aluminum alkyl compounds are such as triisobutyl aluminum, triethyl aluminum, tri-n-propyl aluminum, and the like. Exemplary nickel or cobalt carboxylates or alkoxides include the nickel and cobalt acetates, propionates, benzoates, octoates, and the butoxides, ethoxides, isopropoxides, and the like.

Methods of hydrogenation are well described in U.S. Pat. No. 3,531,448 and U.S. Pat. No. 4,145,298 and U.S. Pat. No. 4,238,202.

Following hydrogenation, the now hydrogenated polymer (still in hydrocarbon solution as a cement) is treated in a hydrogenation catalyst removal step, such as is described in U.S. Pat. No. 3,023,201 or U.S. Pat. No. 3,531,448. I presently consider the process of the latter patent particularly useful. Therein, the hydrogenated polymer cement is treated with an aqueous phosphate solution resulting in a polymer containing solution (cement) from which the catalyst residues can be readily removed.

In treating the hydrogenated polymers in this manner, any ammonium phosphate, e.g., meta, monobasic, or dibasic, in aqueous solution, or a partially or completely ammonia-neutralized aqueous solution of phosphoric acid, can be used, optionally in the presence of excess ammonia. The pH of the solution used should be greater than about 5, preferably greater than about 6, and the $PO_4^{-3}$ ion content should be in the range of about 5 to 50 weight percent. For example, commercial phosphate solution such as 9:30:0, or 10:34:0, can be used. These solutions have $PO_4^{-3}$ contents of about 40 and about 46 weight percent, and $NH_3$ contents of about 11 and about 12 weight percent, respectively, and a pH of about 6.2.

Following the treating of the polymer solutions with the aqueous ammonium phosphate solution, the precipitated catalyst residues are separated from the solution by any means known in the art for the separation of precipitates, such as conveniently by filtration.

ALKALINE WASH

Following separation of the hydrogenation catalyst residues, the hydrogenated polymer-cement then is subject to the alkaline wash step in accordance with the process of my invention.

Compounds which can be employed in the alkaline wash step include solutions or dispersions of alkali metal hydroxides or carbonates, alkaline earth metal hydroxides, and/or ammonia or ammonium carbonate or hydroxide, alone or in admixture. Exemplary suitable compounds further include such as lithium hydroxide, sodium hydroxide, potassium hydroxide, rubidium hydroxide, and cesium hydroxide; and magnesium hydroxide, and calcium hydroxide. Of course, ammonia can be employed as such in admixture with water resulting in ammonium hydroxide. Other suitable alkaline compounds are such as ammonium carbonate, sodium carbonate, or any of the other substantially water soluble alkali metal carbonates also are employable.

For best handling and ease of subsequent removal, it is presently preferred that the alkaline agent employed be one which is soluble in water, rather than forming a dispersion or suspension of the alkaline material in water. For this reason, the alkaline earth materials are much less preferred.

Because of ease of handling, availability, and economy, sodium hydroxide is a presently preferred alkaline material to be employed.

The concentration of the alkaline material in water can range widely, such as about 0.5 to 50 percent by weight, more usually in the range of about 4 to 10 percent by weight.

The ratio of alkaline wash solution/dispersant relative to the polymer cement can vary widely, though presently I consider that about an equal volume of polymer cement versus alkaline wash to be suitable and convenient. This can, of course, vary such, as plus or minus ten percent, with no difficulty involved. Under these conditions, the amount of alkaline material relative to the feedstream of polymer cement can be expressed in terms of the alkaline compound as being broadly from about 100 to 10,000 ppm, presently preferably about 500 to 1,000 ppm, alkaline compound relative to the feedstream. Thus, utilizing these suggested limitations, one skilled in the art can readily calculate the concentration of alkali material needed in the aqueous solution.

The time employed in the alkaline wash step in accordance with my invention is believed not to be critical, with the only requirement being that good contact or mixing is achieved between the aqueous basic solution and the polymer solution. This good contacting can be readily achieved in equipment such as in-line mixers and the like. The temperature employed is not critical, and typically is in the range of about 5° C. to 150° C., preferably about 25° C. to 50° C. The pressure employed is considered not to be critical, and generally simply will be the autogenous pressure generated by the components of the system.

SUBSEQUENT PROCESSING

Neutralization

The polymer solution which has been alkaline-wash treated is separated from the aqueous alkaline treating solution, such as in a settling vessel or coalescer of any convenient and suitable construction in view of the alkaline materials-handling involved. The organic phase containing the polymer dissolved in solvent will contain some traces of aqueous alkaline material.

While adequate water-washing certainly can remove residual retained alkaline substances, less water-washing is involved by employing an intervening H+ neutralization step. Thus, it is preferred to treat the alkaline-washed and separated polymer cement with an acidic reagent, or a reagent producing an acidic result in water, such as carbon dioxide. Such neutralization also avoids or reduces the use of more costly materials of construction in downstream equipment which otherwise might be required if the pH was excessively high. The acidic reagent conveniently can be added to the alkaline polymer solution by means such as an in-line mixer.

The substantially neutralized material then is passed to a coalescing stage in which the aqueous phase remaining in the polymer solution is allowed to separate out for removal from the system. Control of the pH can be conveniently monitored on the water separated from the coalescer (58 in my FIG. 2) to a range of about 3 to 10, preferably about 6 to 8. This aqueous phase usually is discarded since it contains various neutralized salts.

WATER-WASHING

The effluent from the alkaline treatment step, or from pH adjusted where such treatment is employed, is treated with a water-wash step. The water-wash step can be accomplished in essentially the same type of equipment used in the prior alkaline treatment step. The water-wash step while optional, is preferred, and serves to remove any residual alkaline or other water soluble salts remaining in the polymer solution. The effluent from the water-wash step is passed to a coalescing stage wherein the major portion of the water remaining in the water washed polymer solution is removed.

DRYING

The next step, prior to passing the polymer solution to the metallation (lithiation) reaction zone, is a drying step. The drying of the polymer solution can be carried out by various methods.

For example, the drying column procedure as described in U.S. Pat. No. 4,278,506, incorporated herein by reference, in which dry solvent is added to the polymer solution and flashed overhead to result in a dried polymer solution suitable for the metallation reaction zone. Presently, the preferred method of drying the polymer solution is the drying column as disclosed in U.S. Pat. No. 4,278,506.

A polymer-solvent mixture is passed to a fractionation-stripping zone wherein components lower boiling than the solvent are separated and a purified polymer-solvent mixture is recovered by contacting the polymer-solvent mixture in said zone with dry solvent stripping vapors added to the bottom portion of the fractionation column to act as a stripping agent. The added stripping component can be taken from a source other than the fractionation column, e.g., storage for dry solvent. The polymer-solvent mixture recovered as the fractionation column bottoms is then passed to a subsequent reaction.

In a specific embodiment, hydrogenated butadiene/styrene copolymer in a cyclohexane solvent is passed to a fractionation-stripping column to strip water and any other components boiling at lower temperatures than the solvent from the polymer-in-solvent. Dry cyclohexane, is vaporized and added to the bottom portion of the fractionation column to act as a stripping vapor for the water and any other lower boiling materials. The polymer and solvent are recovered as the bottom product from the fractionation column and passed to a metallation reactor for reaction with n-butyllithium.

Other suitable drying methods include dessicant beds utilizing materials such as alumina, bauxite, or the like. A stream of (dry) nitrogen can be passed through the polymer solution as a drying procedure.

FUNCTIONALIZATION

Metallation of the polymer and subsequent reaction of the metallated polymer with a reactive nitrogen-containing organic compound to prepare the dispersant viscosity index improver is carried out according to procedures such as disclosed in U.S. Pat. No. 4,145,298; and for the carburetor detergent additives in accordance with procedures such as described in U.S. Pat. No. 4,238,202.

EXAMPLES

Examples provided are intended to assist one skilled in the art to a further understanding of the invention, without limiting the proper scope thereof. Particular species, conditions, amounts of materials, ranges of materials, and the like, employed in these examples, are designed to be exemplary and not limitative of the scope of my invention.

EXAMPLE I

Runs were made to examine the effect of various treatments on the n-butyllithium scavenger (poison) level in a hydrogenated polymer solution (cement) (9.3% solids) in cyclohexane. The polymer was a butadiene/styrene (40/60) copolymer which had been hydrogenated by a nickel carboxylate salt/organoaluminum compound catalyst. The catalyst residues were removed by treating the polymer solution with aqueous ammonium phosphate, and then filtering the polymer solution.

The scavenger levels were determined by the following procedure and recipe:

| Scavenger Recipe | |
|---|---|
| Hydrogenated polymer, cyclohexane solution (about 9.5% solids) | 100 parts by wt. |
| N,N,N',N'—Tetramethylethylenediamine (TMEDA) | 1.39 parts by wt. |
| Styrene | 3 parts by wt. |
| Temperature, °C. | 70 |

The above mixture was titrated with n-butyllithium solution of known concentration until a light yellow color persists. The amount of n-butyllithium required to reach this end point is taken as the scavenger level expressed in parts by weight n-butyllithium per 100 parts by weight of polymer.

The following Runs were conducted at room temperature (about 27° C.). A 400 mL volume of polymer solution was utilized in each Run. When employed, filtration was done on a suction funnel with a 1 inch deep bed of diatomaceous earth (Dicalite) as the filter medium. Results of the Runs are shown in Table I:

TABLE I

| Run No. | A Filtration Dicalite | B N$_2$ Purge[a], minutes | C Caustic Wash[b] | D Water Wash[c] | Scavenger, php nBuLi |
|---|---|---|---|---|---|
| 1[d] | Yes | 5 | No | No | 0.39 |
| 2[d] | Yes | 5 | No | No | 0.45 |
| 3[d] | Yes | 30 | No | No | 0.39 |
| 4 | No | 5 | No | No | 0.63 |
| 5 | No | 5 | No | No | 0.57 |
| 6 | No | 30 | No | No | 0.38 |
| 7[e] | Yes | 5 | No | Yes | 1.20 |
| 8[f] | Yes | 5 | Yes | Yes | 0.33 |
| 9[f] | Yes | 5 | Yes | Yes | 0.28 |
| 10[f] | Yes | 30 | Yes | Yes | 0.13 |

[a]Flow rate of about 3L/minute.
[b]Utilized 400 mL of aqueous NaOH, 6% by wt.
[c]Utilized 400 mL of water.
[d]Sequence of treatment: A/B
[e]Sequence of treatment: D/A/B
[f]Sequence of treatment: C/D/A/B The results in Table I demonstrate that the alkaline wash step provided a significant reduction in scavenger level required by the hydrogenated polymer solution.

EXAMPLE II

Runs were carried out to metalate the hydrogenated polymer, and then to react the metalated polymer with a reactive organic nitrogen compound, p-dimethylaminobenzaldehyde, so as to prepare a nitrogen-containing polymer according to the teaching of U.S. Pat. No. 4,145,298. The hydrogenated polymer solution was treated in various ways to determine the n-butyllithium scavenger level resulting therefrom and the final product was analyzed for resulting N-content as an indication of metalation effectiveness.

The hydrogenated polymer solution subjected to the treatments (all at about 27° C.) described below was the same type as that employed in Example I. After being treated as described below, each solution was subjected to a drying step utilizing azeotropic distillation of added dry cyclohexane. Each dried polymer solution then was utilized in a metalation reaction employing 1.39 php TMEDA and 0.77 php effective n-butyllithium for 1.5 hr at 70° C. Effective n-butyllithium refers to that amount in excess of the scavenger. Each mixture was then reacted with p-dimethylaminobenzaldehyde, 1.79 php, and the products recovered by coagulation of the cyclohexane solutions with isopropyl alcohol. The polymer was redissolved and precipitated twice. The thrice precipitated polymer products were dried under vacuum.

The treatment procedures and the results obtained are shown in Table II:

TABLE II

| Run No. | Treatment Type | C$_8$ Alcohol[a] ppm | THF[b] ppm | Scavenger php nBuLi | Polymer N, % |
|---|---|---|---|---|---|
| 11 | None (as received) | 194 | 483 | —[e] | — |
| 12 | Passed over activated alumina | <20 | <10 | 0.16 | 0.13 |
| 13 | Water washed | 220 | 200 | 0.96 | 0.01 |
| 14 | Caustic wash, water and HCl washed[c] | 207 | <10 | 0.83 | 0.14 |
| 15 | HCl wash, water wash[d] | — | — | 0.90 | 0.02 |

[a]Suspected poison, 2-ethylhexanol, a hydrogenation catalyst by-product.
[b]THF is tetrahydrofuran, a possible poison for the metalation reaction.
[c]Utilized KOH solution of about 6 wt. % concentration. Emulsions tended to form that finally were broken by adding isopropyl alcohol.
[d]Utilized 10% HCl then water washed until neutral.
[e]Dash indicates not determined.

The results in Table II demonstrate that alumina treatment provides a low scavenger level and low levels of suspected poisons. The product polymer also has an N-content indicating effective metalation, and that the N-content is at a suitably high level for use as a dispersant type viscosity index improver. Even though the scavenger level in Run 14 (alkaline wash) apparently was not reduced to a level comparable to that achieved in Run 12, nevertheless the resulting N-content of the polymers was essentially the same. A water wash or an acid wash (Runs 13 and 15) was not effective as treatment especially in view of the low resulting polymer N-contents.

EXAMPLE III

A five gallon portion of hydrogenated polymer solution which had been filtered free of catalyst residues was washed at about 27° C. with: (1) an approximately equal volume of 6% by weight aqueous sodium hydroxide solution and then (2) an approximately equal volume of water then dried by addition of dry cyclohexane and azeotropic distillation thereof. A portion of the same hydrogenated polymer feedstream was dried in the same manner but without any wash treatment. Scavenger levels of these two dried polymer solutions were determined as in Example I. The results obtained are shown in Table III:

TABLE III

| Run No. | Polymer Solution Caustic/Water Washed | Scavenger, php N—BuLi |
|---|---|---|
| 16 | Yes | 0.26 |
| 17 | No | 0.74 |

The results in Table III demonstrate that the caustic wash/water wash treatment of the instant invention can reduce the scavenger level by 65% in comparison to the absence of any treatment except drying.

EXAMPLE IV

Other Runs were conducted to demonstrate the effectiveness of the caustic wash procedure in reducing the scavenger level for hydrogenated polymer solutions used for metalation and subsequent reaction with an organic nitrogen-containing compound. The same type of hydrogenated polymer feedstream as previously employed was used in these runs. After the indicated treatment each polymer solution was dried by azeotropic distillation with added dry cyclohexane as previously described. The dried polymer solutions were subjected to metalation and subsequent reaction with p-dimethylaminobenzaldehyde in a manner similar to that described in Example II. Scavenger levels were determined for each treated polymer solution by the procedure given in Example I, and nitrogen contents of the final polymer products were also determined. The treatments employed and the results obtained are shown in Table IV:

TABLE IV

| Run No. | Treatment | Alcohol$^a$ % | C$_8$ Acid$^a$ % | Scavenger php nBuLi | Polymer N, % |
|---|---|---|---|---|---|
| 18 | None | 0.03 | 0.06 | 0.70 | 0.05 |
| 19 | NaOH wash$^b$ | — | — | 0.31 | 0.106 |
| 20 | Stored over activated$^c$ alumina | — | — | 0.24 | 0.106 |
| 21 | NaOH wash$^d$ | 0.04 | 0.002 | 0.36 | 0.136 |

$^a$2-Ethylhexanol and 2-ethylhexanoic acid are suspected poisons from hydrogenation catalyst as by-products.
$^b$Washed with an equal volume of 5% aqueous NaOH at about 27° C.
$^c$Utilized about 20% by volume alumina for 72 hours at about 27° C.
$^d$Washed with 1000 ppm NaOH in an equal volume of water at about 21° C. then neutralized with CO$_2$ to a pH of 7.

The results in Table IV demonstrate that the alkaline wash treatments were nearly as effective as activated alumina in reducing scavenger level for metalation reaction, but gave essentially the same results or better in terms of nitrogen content in the final polymer.

My disclosure, including data, has illustrated the value and effectiveness of my invention. The examples, the knowledge and background of the field of the invention an the general principles of chemistry and other applicable sciences have formed the bases from which the broad descriptions of my invention including the ranges of conditions and the generic groups of operant components have been developed and formed the bases for my claims here appended.

I claim:
1. A process for the preparation of a nitrogen-containing functionalized hydrogenated polymer, which comprises:
   preparing a polymer cement comprising a polymer of a conjugated diene, optionally with a monovinylarene, dissolved in hydrocarbon solvent,
   hydrogenating the polymer in said polymer cement in presence of a hydrogenation catalyst, thereby producing a hydrogenated polymer cement containing hydrogenation catalyst residues,
   removing hydrogenation catalyst residues from the hydrogenated polymer cement,
   alkaline-washing the hydrogenated polymer cement with an aqueous alkaline wash, wherein said alkaline wash step employs an aqueous solution or dispersion of an alkali metal hydroxide, alkaline earth metal hydroxide, ammonium hydroxide, ammonium carbonate, or alkali metal carbonate, wherein said alkaline wash employs an aqueous solution/dispersion containing about 0.5 to 50 percent by weight of said alkaline material in water, and employs a ratio of about 100 to 10,000 ppm alkaline compound relative to polymer cement,
   water-washing said alkaline-washed hydrogenated polymer cement with water to produce a cleansed polymer cement,
   lithiating the cleansed hydrogenated polymer cement, and
   reacting the lithiated polymer cement with a nitrogen-containing organic compound reactive with the lithiated polymer and effective to produce a nitrogen-containing functionalized hydrogenated polymer.
2. The process according to claim 1 wherein said alkaline wash step employs an aqueous solution or dispersion of an alkali metal hydroxide, ammonium hydroxide, ammonium carbonate, or alkali metal carbonate.
3. The process according to claim 2 wherein said alkaline wash employs an aqueous solution/dispersion containing about 4 to 10 percent by weight of said alkaline material in water.
4. The process according to claim 3 wherein said alkaline wash employs sodium hydroxide or ammonium hydroxide.
5. The process according to claim 1 employing said alkaline wash in a ratio of about 500 to 1,000 ppm alkaline compound relative to polymer cement.
6. The process according to claim 5 employing an alkaline wash contacting temperature in the range of about 5° to 150° C.
7. The process according to claim 1 wherein said alkaline wash step comprises the following sub-steps:

(a) contacting said polymer cement with said alkaline wash;
(b) separating polymer cement from alkaline wash, leaving a polymer cement containing traces of alkaline material,
(c) neutralizing said polymer cement containing traces of alkaline agent, thereby preparing a neutralized polymer cement,
(d) water washing said neutralized polymer cement,
(e) drying said water washed polymer cement.

8. The process according to claim 6 wherein said polymer is a butadiene/styrene copolymer.

9. The process according to claim 8 wherein said butadiene/styrene copolymer is about a 40:60 butadiene:styrene copolymer.

10. The process according to claim 9 wherein said functionalization step employs p-dimethylaminobenzaldehyde.

11. The process according to claim 1 wherein said functionalization step employs p-dimethylaminobenzaldehyde.

12. The process according to claim 7 wherein said functionalization step employs p-dimethylaminobenzaldehyde.

* * * * *